(12) United States Patent
Onishi et al.

(10) Patent No.: US 10,375,607 B2
(45) Date of Patent: Aug. 6, 2019

(54) MOBILE COMMUNICATION SYSTEM, NODE APPARATUS, AND INTER-NETWORK HANDOVER CONTROL METHOD

(71) Applicant: LENOVO INNOVATIONS LIMITED (HONG KONG), Quarry Bay, Hong Kong (HK)

(72) Inventors: Koji Onishi, Tokyo (JP); Toshiyuki Tamura, Tokyo (JP)

(73) Assignee: Lenovo Innovations Limited (Hong Kong), Hong Kong (CN)

( * ) Notice: Subject to any disclaimer, the term of this patent is extended or adjusted under 35 U.S.C. 154(b) by 1125 days.

(21) Appl. No.: 13/754,442

(22) Filed: Jan. 30, 2013

(65) Prior Publication Data

US 2013/0148630 A1 Jun. 13, 2013

Related U.S. Application Data

(63) Continuation of application No. 12/992,636, filed as application No. PCT/JP2009/060401 on Jun. 1, 2009, now abandoned.

(30) Foreign Application Priority Data

Jun. 3, 2008 (JP) .................................. 2008-145211

(51) Int. Cl.
*H04W 36/00* (2009.01)
*H04W 36/14* (2009.01)
(Continued)

(52) U.S. Cl.
CPC ........ *H04W 36/0022* (2013.01); *H04W 36/14* (2013.01); *H04W 76/11* (2018.02);
(Continued)

(58) Field of Classification Search
CPC ............. H04L 65/1016; H04L 65/1069; H04L 65/1006; H04L 65/1043; H04L 65/103;
(Continued)

(56) References Cited

U.S. PATENT DOCUMENTS 8,811,954 B1 * 8/2014 Mahdi ..................... H04L 65/40
370/338
2004/0246990 A1 * 12/2004 Krishnamurthi .. H04W 36/0022
370/466
(Continued)

FOREIGN PATENT DOCUMENTS

JP 2004221676 A 8/2004
JP 2006080693 A 3/2006
(Continued)

OTHER PUBLICATIONS

3GPP, "3rd Generation Partnership Project; Technical Specification Group Services and System Aspects; 3GPP System Architecture Evolution: Report on Technical Options and Conclusions (Release 7)", 3GPP TR 23.882, V1.15.0, Feb. 2008, Cited in JP Office Action.
(Continued)

*Primary Examiner* — Asad M Nawaz
*Assistant Examiner* — Najeeb Ansari
(74) *Attorney, Agent, or Firm* — Kunzler Bean & Adamson

(57) ABSTRACT

A mobile communication system includes at least one mobile terminal that can access a circuit switched network and a wireless broadband network, and a node apparatus. The node apparatus integrates, into one physical node, a first gateway node interconnecting the circuit switched network and an IP network and a second gateway node interconnecting a core network accommodating the wireless broadband network and an external packet data network. When the mobile terminal performs handover from one of the circuit
(Continued)

switched network and the wireless broadband network to the other network, one of the first gateway node and the second gateway node, being a handover-destination node, allocates call connection path node identification information managed by the other gateway note being a handover-source node, as new call connection path node identification information of the handover-destination node.

4 Claims, 5 Drawing Sheets

(51) Int. Cl.
| | |
|---|---|
| *H04W 80/04* | (2009.01) |
| *H04W 80/10* | (2009.01) |
| *H04W 88/06* | (2009.01) |
| *H04W 88/16* | (2009.01) |
| *H04W 92/02* | (2009.01) |
| *H04W 76/11* | (2018.01) |

(52) U.S. Cl.
 CPC ............ *H04W 80/04* (2013.01); *H04W 80/10* (2013.01); *H04W 88/06* (2013.01); *H04W 88/16* (2013.01); *H04W 92/02* (2013.01)

(58) Field of Classification Search
 CPC . H04L 65/1073; H04L 65/1083; H04L 12/66; H04L 65/102; H04W 36/0022; H04W 92/02; H04W 36/14; H04W 88/16; H04W 80/10; H04W 76/10
 USPC ................................ 370/352–356, 331, 401
 See application file for complete search history.

(56) References Cited

U.S. PATENT DOCUMENTS

| | | | |
|---|---|---|---|
| 2005/0245261 A1 | 11/2005 | Ejzak | |
| 2007/0014281 A1* | 1/2007 | Kant | H04L 29/06027 370/352 |
| 2007/0058789 A1* | 3/2007 | Lim | H04W 76/025 379/88.17 |
| 2007/0060124 A1* | 3/2007 | Kalavade | H04M 3/54 455/433 |
| 2007/0291733 A1 | 12/2007 | Doran et al. | 370/352 |
| 2008/0117884 A1 | 5/2008 | Ishii et al. | 370/338 |
| 2008/0123625 A1* | 5/2008 | Buckley | H04M 7/123 370/352 |
| 2008/0268824 A1* | 10/2008 | Allen | H04M 3/42059 455/415 |
| 2008/0276068 A1* | 11/2008 | Ashraf | H04L 65/1016 712/20 |
| 2009/0073936 A1* | 3/2009 | Jentz | H04W 36/0022 370/331 |
| 2009/0080382 A1* | 3/2009 | Chen | H04W 36/0016 370/331 |
| 2009/0086674 A1* | 4/2009 | Ejzak | H04W 36/0016 370/331 |
| 2009/0280810 A1* | 11/2009 | Mahdi | H04W 76/041 455/436 |
| 2009/0323636 A1* | 12/2009 | Dillon | H04L 29/12188 370/331 |
| 2009/0323656 A1* | 12/2009 | Mahdi | H04W 36/0022 370/338 |
| 2010/0157985 A1* | 6/2010 | Nakada | H04W 48/18 370/352 |
| 2010/0246530 A1 | 9/2010 | Pehrsson et al. | 370/331 |
| 2011/0032923 A1* | 2/2011 | Ho | H04W 88/14 370/342 |

FOREIGN PATENT DOCUMENTS

| | | |
|---|---|---|
| JP | 2006186855 A | 7/2006 |
| JP | 2006197536 A | 7/2006 |
| JP | 2006203641 A | 8/2006 |
| JP | 2006246198 A | 9/2006 |
| JP | 2006526964 A | 11/2006 |
| JP | 2008-28663 A | 2/2008 |
| JP | 200835420 A | 2/2008 |
| JP | 2008-532364 A | 8/2008 |
| KR | 1020060018870 A | 3/2006 |
| KR | 10-0619385 B | 8/2006 |
| WO | 2006/105732 A1 | 10/2006 |
| WO | 2006109462 A | 10/2006 |
| WO | 2007111860 A2 | 10/2007 |
| WO | 2007124306 A2 | 11/2007 |
| WO | 2008059570 A | 5/2008 |

OTHER PUBLICATIONS

Japanese Office Action for JP Application No. 2012-157081 dated Jul. 23, 2013 with English Translation.
Korean Office Action for KR10-2012-7010146 dated Sep. 6, 2012.
Japanese Office Action for JP2008-145211 dated May 15, 2012.
Korean Office Action for KR10-2010-7029121 dated Oct. 19, 2011.
International Search Report for PCT/JP2009/060401 dated Jul. 7, 2009.
3GPP TS 23.206 V7.5.0, 3rd Generation Partnership Project; Technical Specification Group Services and System Aspects; Voice Call Continuity (VCC) between Circuit Switched (CS) and IP Multimedia Subsystem (IMS); Stage 2 (Release 7), Dec. 2007.
The Extended European Search Report for EP Application No. 09758440.3 dated Jun. 10, 2013.
QUALCOMM Europe, "Call Flows for Single Radio VCC", Discussion & Approval, 3GPP TGS SA WG2 #57, Apr. 23-27, 2007, 7 Pages total.
QUALCOMM Europe, "Single Radio VCC: Outline of Basic Scenarios", Discussion, 3GPP TSG SA WG2 Architecture, Feb. 12-15, 2007, S2-070735, 36 Pages total.
Communication dated Sep. 3, 2014 from the Japanese Patent Office in counterpart Application No. 2013-265456.

\* cited by examiner

MOBILE COMMUNICATION SYSTEM, NODE APPARATUS, AND INTER-NETWORK HANDOVER CONTROL METHOD

TECHNICAL FIELD

This invention relates to a mobile communication system adapted to perform handover control of a mobile terminal between a circuit switched network and a wireless broadband network and further relates to a node apparatus and an inter-network handover control method that are suitable for the mobile communication system.

BACKGROUND ART

In the 3GPP (3rd Generation Partnership Project), there have been discussions about methods for continuing a voice service between different access networks. VCC (Voice Call Continuity) can be cited as one example of them (see Non-Patent Document 1). The VCC is, specifically, realized by using a VCC-AS (Application Server) provided in an IMS (Internet Protocol Multimedia Subsystem).

FIG. 1 is a diagram for explaining the general end-to-end call control scenario of transfer between access domains defined in Non-Patent Document 1 and so on. A mobile terminal B can access a cellular mobile network through cellular wireless communication [3GPP-CS (Circuit Switched)]. The mobile terminal B can also access an IMS network through, for example, an in-house wireless LAN (Local Area Network).

In FIG. 1, for example, when a mobile terminal B on the incoming side moves from an IMS domain to a CS domain, i.e. performing handover, the mobile terminal B starts call setup in the CS domain (step S101-CS). That is, the mobile terminal B sends a SETUP message (call setup message in the CS phone network) to an MSC (Mobile Services Switching Center) 100. For anchoring this call control at a VCC-AS 104, the SETUP message is transferred to a CSCF (Call Server Control Function) 103 through a MGCF (Media Gateway Control Function)/MGW (Media Gateway) 101 (steps S102 and S103) and further transferred from the CSCF 103 to the VCC-AS 104 (step S104).

Then, the VCC-AS 104 sends a SIP UPDATE (session update) message for starting to change call connection or a Re-INVITE (request to establish a re-session) message to the CSCF 103 (step S105). By this message, an MGW IP (Internet Protocol) address indicating a new call connection path and new SDP (Session Description Protocol) information are transmitted to the CSCF 103 from the VCC-AS 104. The SIP UPDATE message or the Re-INVITE message is transferred from the CSCF 103 to a CSCF 105 in a partner-side IMS domain (step S106) and finally transferred to a mobile terminal A being a communication partner (step S107). The mobile terminal A changes a voice packet transfer destination IP address to the transferred MGW IP address. By this, a voice packet transfer path (voice bearer) is switched on an end-to-end basis.

On the other hand, in FIG. 1, when a mobile terminal B moves from a CS domain to an IMS domain, i.e. performing handover, the mobile terminal B starts call setup in the IMS domain (step S101-IMS). That is, the mobile terminal B sends a SIP INVITE (request to establish a session) message to a CSCF 103. This SIP INVITE message is transferred to a VCC-AS 104 from the CSCF 103 (step S104). The VCC-AS 104 sends a SIP UPDATE (session update) message for starting to change call connection or a Re-INVITE (request to establish a re-session) message to the CSCF 103 (step S105). By this message, an IP address of the mobile terminal B indicating a node of a new call connection path and new SDP information are transmitted to the CSCF 103. The SIP UPDATE message or the Re-INVITE message is transferred from the CSCF 103 to a CSCF 105 in a partner-side IMS domain (step S106) and finally transferred to a mobile terminal A being a communication partner (step S107). The mobile terminal A changes a voice packet transfer destination IP address to the transferred IP address of the mobile terminal B. By this, a voice packet transfer path (voice bearer) is switched on an end-to-end basis.

While the above is the scenario of voice service continuity following the mobile terminal handover between the IMS domain and the CS domain, the VCC-AS is also expected to be used in the same manner as in the above when continuing a voice service between the CS domain and a predetermined wireless broadband [e.g. LTE (Long Term Evolution) access or Non-3GPP access].

Non-Patent Document 1: 3GPP TS23.206 V7.5.0 "Voice Call Continuity (VCC) between Circuit Switched (CS) and IP Multimedia Subsystem (IMS)"

DISCLOSURE OF THE INVENTION

However, when continuing a voice service between different access networks using a VCC-AS, communication processing is required between a CSCF and the VCC-AS in an IMS. The communication processing between the CSCF and the VCC-AS includes, for example, as described above, transfer processing of a call setup message from the CSCF to the VCC-AS and transfer processing of a session update message or a re-session establishing request message from the VCC-AS to the CSCF. That is, much time is required for the transfer processing of these messages. Further, much time is also required for processing in the VCC-AS. Consequently, when the VCC-AS is used, there arises a problem in that the handover processing time increases.

This invention seeks to provide a mobile communication system that can realize handover between different access networks without providing a VCC-AS and that can shorten the handover processing time.

This invention further seeks to provide a node apparatus suitable for the above mobile communication system.

This invention still further seeks to provide an inter-network handover control method suitable for the above mobile communication system.

According to a first aspect of this invention, there is provided a mobile communication system comprising at least one mobile terminal that can access a circuit switched network and a wireless broadband network, and a node apparatus. The node apparatus integrates, into one physical node, a first gateway node interconnecting the circuit switched network and an IP network and a second gateway node interconnecting a core network accommodating the wireless broadband network and an external packet data network through the IP network. In this mobile communication system, when the mobile terminal performs handover from one of the circuit switched network and the wireless broadband network, being a handover-source network, to the other network being a handover-destination network, one of the first gateway node and the second gateway node, being a handover-destination gateway node, allocates call connection path node identification information managed by the other gateway note being a handover-source gateway node, as new call connection path node identification information of the handover-destination gateway node.

According to a second aspect of this invention, there is provided a node apparatus provided in a mobile communication system comprising at least one mobile terminal that can access a circuit switched network and a wireless broadband network. The node apparatus integrates, into one physical node, a first gateway node interconnecting the circuit switched network and an IP network and a second gateway node interconnecting a core network accommodating the wireless broadband network and an external packet data network through the IP network. In this node apparatus, when the mobile terminal performs handover from one of the circuit switched network and the wireless broadband network, being a handover-source network, to the other network being a handover-destination network, one of the first gateway node and the second gateway node, being a handover-destination gateway node, allocates call connection path node identification information managed by the other gateway note being a handover-source gateway node, as new call connection path node identification information of the handover-destination gateway node.

According to a third aspect of this invention, there is provided an inter-network handover control method in a mobile communication system comprising at least one mobile terminal that can access a circuit switched network and a wireless broadband network. In this inter-network handover control method, a first gateway node interconnecting the circuit switched network and an IP network and a second gateway node interconnecting a core network accommodating the wireless broadband network and an external packet data network through the IP network are integrated into one physical node. Further, in this inter-network handover control method, when the mobile terminal performs handover from one of the circuit switched network and the wireless broadband network, being a handover-source network, to the other network being a handover-destination network, one of the first gateway node and the second gateway node, being a handover-destination gateway node, allocates call connection path node identification information managed by the other gateway note being a handover-source gateway node, as new call connection path node identification information of the handover-destination gateway node.

According to this invention, it becomes possible to realize handover between different access networks without providing a VCC-AS and to shorten the handover processing time.

BEST MODE FOR CARRYING OUT OF THE INVENTION

Figure 1:
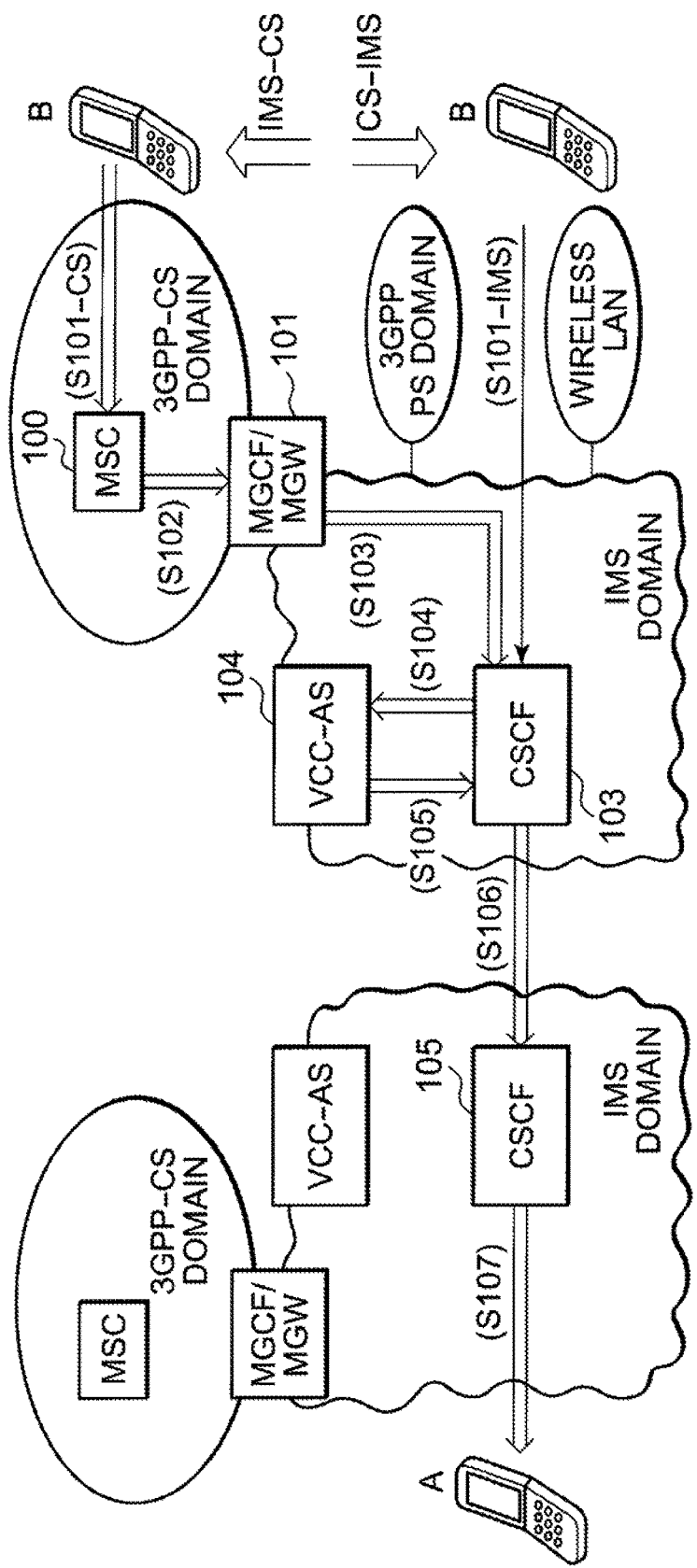
FIG. 1 is a diagram for explaining the general end-to-end call control scenario of transfer between access domains.
Figure 2:
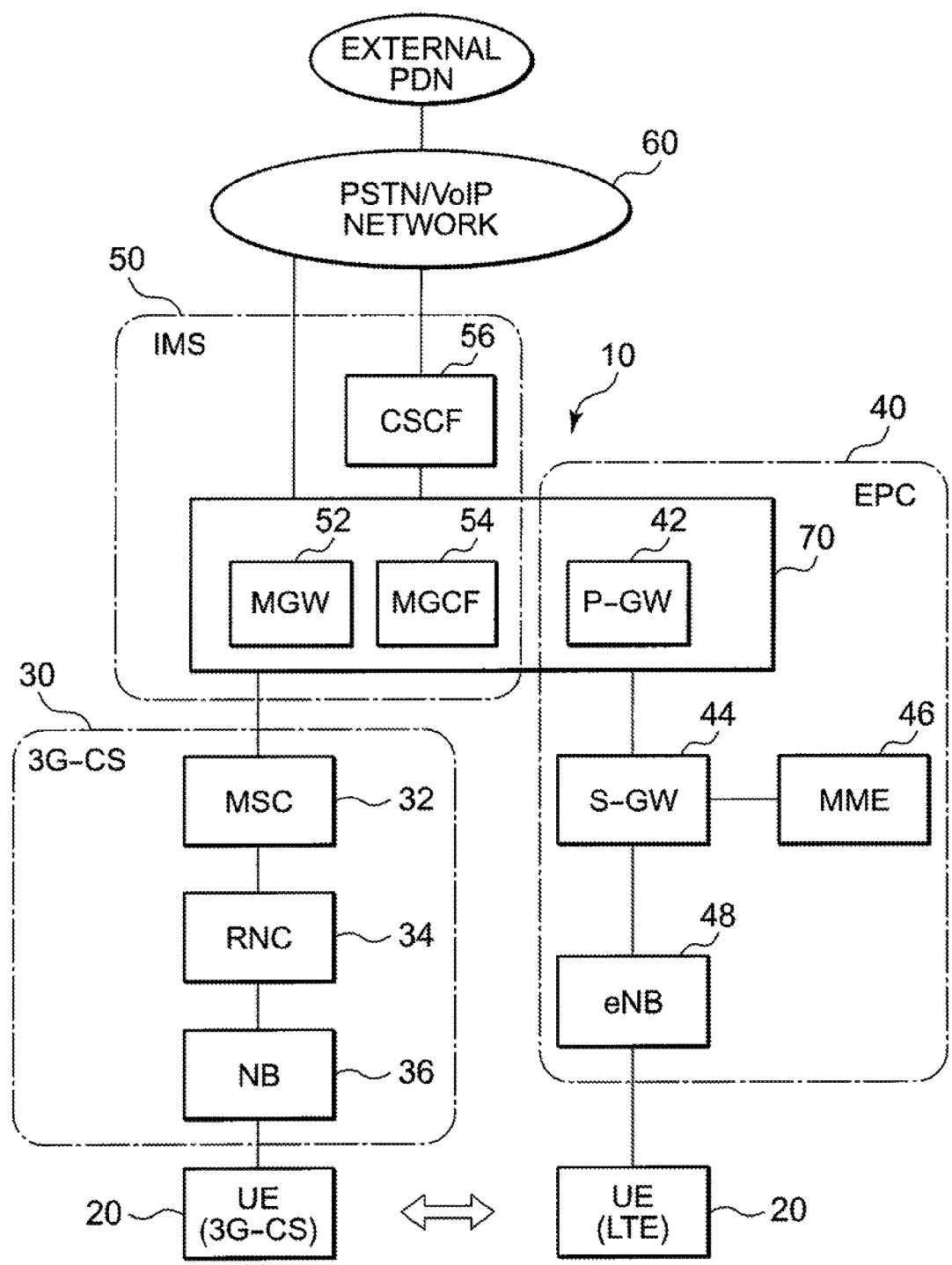
FIG. 2 is a block diagram showing the configuration of a mobile communication system according to an embodiment of this invention.

FIG. 2 is a block diagram showing the configuration of a mobile communication system 10 according to an embodiment of this invention. The mobile communication system 10 includes at least one UE (User Equipment) (mobile terminal) 20, as a so-called dual terminal, having a function of accessing a CS (Circuit Switched) network and a function of accessing a wireless broadband network. The mobile communication system 10 further includes a 3G (3rd Generation)-CS network 30 as one example of the CS network and an EPC (Evolved Packet Core) network 40 as one example of the wireless broadband network.

The 3G-CS network 30 includes an MSC (Mobile Services Switching Center) 32, an RNC (Radio Network Controller) 34, and an NB (Node B) (radio base station) 36. The MSC 32 is a core network node that handles circuit switched calls (mainly voice calls). The RNC 34 is an access network node that controls the radio base station 36. The NB 36 is a radio base station apparatus that performs communication with the UE 20.

The EPC network 40 accommodates, for example, the LTE (Long Term Evolution) access. The EPC network 40 includes a P-GW (Packet Data Network Gateway) 42 as a second gateway node, an S-GW (Serving Gateway) 44, an MME (Mobility Management Entity) 46, and an eNB (evolved Node B) 48. The P-GW 42 as the second gateway node has a function of interconnecting the EPC network 40 and an external PDN (Packet Data Network). Herein, in the case of the EPC network 40, call connection path node identification information (IP address) is set per UE 20. The P-GW 42 performs allocation of an IP address to each UE 20 and management thereof. The S-GW 44 is a node accommodating U-plane of 3G-PS and LTE. The U-plane represents a function (or protocol) of transferring "user information" being main information of communication. The MME 46 is a node that performs LTE mobility management. The eNB 48 is a radio base station apparatus that performs communication with the UE 20.

The 3G-CS network 30 and the EPC network 40 are connected to an IMS (IP Multimedia Subsystem) 50. The IMS 50 is a system that provides an IP-based multimedia service to a mobile terminal without depending on an access network.

The IMS 50 includes an MGW (Media Gateway) 52 and an MGCF (Media Gateway Control Function) 54 as a first gateway node and a CSCF (Call Server Control Function) 56. The MGW 52 is provided in a U-plane and performs media conversion (e.g. Codec conversion of voice information), QoS (Quality of Service) control, and so on. The MGCF 54 is a node that performs protocol conversion between an SIP (Session Initiation Protocol) and an ISUP (ISDN User Part: protocol for sending information such as one's own telephone number and destination telephone number when setting up a telephone call using ISDN, or the like) in a C-plane. The C-plane represents a function (or protocol) of transferring "control information" for connection (call connection), disconnection, or the like between a mobile terminal and a circuit. The CSCF 56 is a node that performs call control (user registration and session setup) according to the SIP in the IMS 50.

A PSTN (Public Switched Telephone Network)/VoIP (Voice over Internet Protocol) network 60 is a network located between the IMS 50 and a voice call partner.

Herein, in the case of the 3G-CS network 30, the UE 20 does not have an individual IP address. Therefore, call connection path node identification information (IP address) seen from a communication partner (partner-side UE connected through the PSTN/VoIP network 60) is an IP address used by the MGCF 54 and the MGW 52 accommodating the UE 20. At least one of the MGCF 54 and the MGW 52 manages this IP address. Hereinbelow, a description will be given assuming that the MGCF 54 manages this IP address.

A node apparatus 70 (FIG. 3) integrates the MGW 52/MGCF 54 as the first gateway node and the P-GW 42 as the second gateway node, which have never cooperated with each other before, into one physical node. Herein, "integrates—into one physical node" means incorporating the first gateway node (MGW 52 and MGCF 54) and the second gateway node (P-GW 42) into a single apparatus. By integrating the MGW 52/MGCF 54 and the P-GW 42 into one physical node, information that both nodes have separately managed before can be shared between them.

Specifically, the MGCF 54 can acquire call connection path node identification information in the EPC network 40 (e.g. IP address of the UE 20), which is the information managed by the P-GW 42. On the other hand, the P-GW 42 can acquire call connection path node identification information in the 3G-CS network 30 (e.g. IP address used by the MGW 52 and the MGCF 54), which is the information managed by the MGCF 54.

That is, at the time of handover from the 3G-CS network 30 to the EPC network 40, the P-GW 42 allocates an IP address used by the MGW 52 and the MGCF 54 when the UE 20 is present in the 3G-CS network 30, as an IP address to be used by the UE 20 when it is present in the EPC network 40. On the other hand, at the time of handover from the EPC network 40 to the 3G-CS network 30, the MGCF 54 allocates an IP address used by the UE 20 when it is present in the EPC network 40, as an IP address to be used by the MGW 52 and the MGCF 54.

Figure 3:
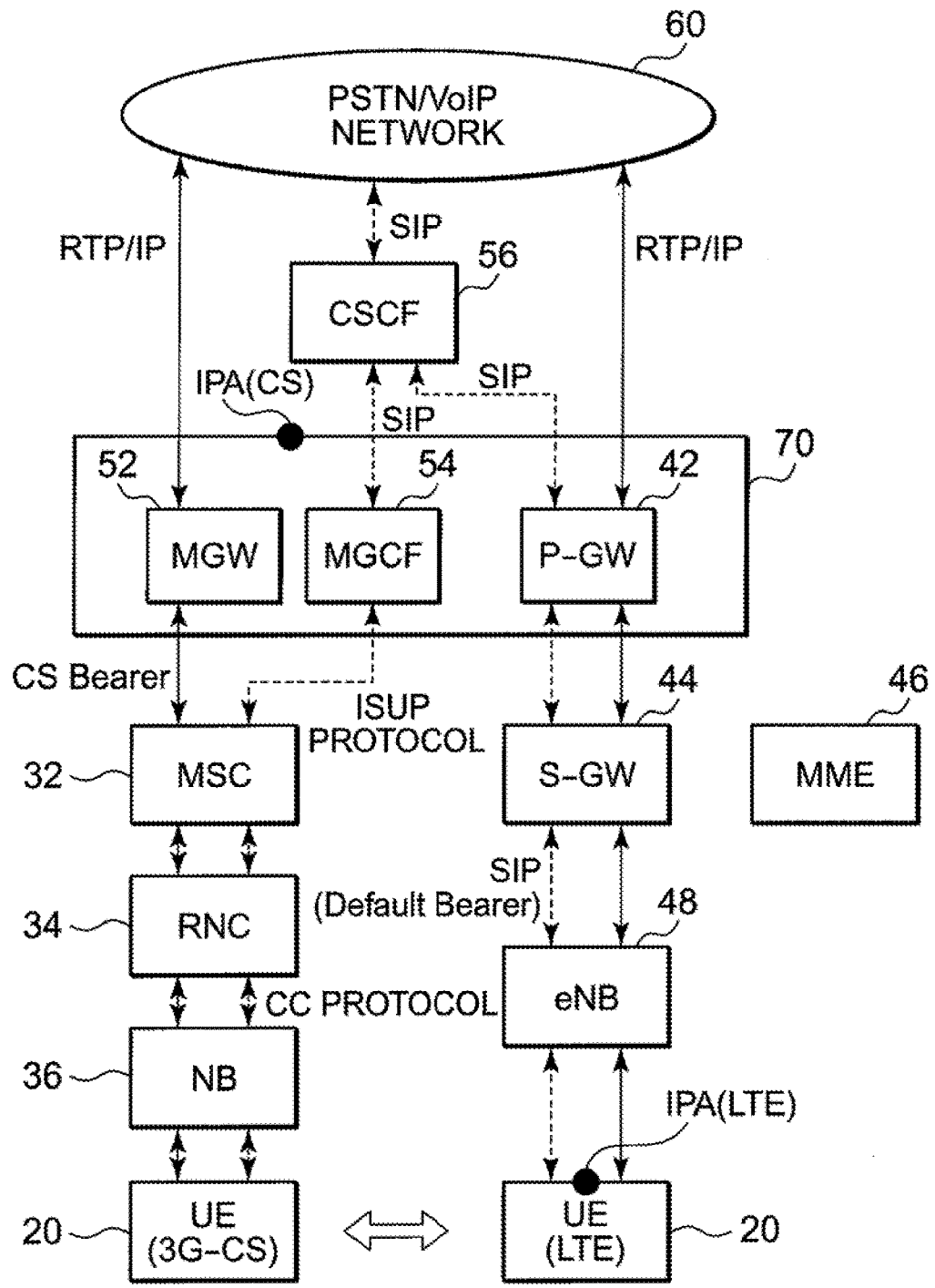
FIG. 3 is a diagram for explaining path setup of C- and U-planes when a voice call is performed through 3G-CS and path setup of C- and U-planes when a voice call is performed through LTE, in the mobile communication system shown in FIG. 2.

FIG. 3 is a diagram showing path setup of the respective planes when a voice call is performed through the 3G-CS and path setup of the respective planes when a voice call is performed through the LTE, in the mobile communication system 10 shown in FIG. 2. In FIG. 3, the path for the C-plane is indicated by broken lines while the path for the U-plane is indicated by solid lines. Hereinbelow, a description will be given assuming that the UE 20 present in the 3G-CS is a UE (3G-CS) 20 and the UE 20 present in the LTE is a UE (LTE) 20.

A description will be given in the case of performing a voice call through the 3G-CS. With respect to the C-plane, the UE (3G-CS) 20 communicates with the MSC 32 according to a CC (Call Control) protocol and the MSC 32 communicates with the MGCF 54 according to the ISUP protocol. The MGCF 54 performs protocol conversion between the ISUP and the SIP. Communication between the MGCF 54 and the CSCF 56 and communication between the CSCF 56 and the PSTN/VoIP network 60 are each performed according to the SIP protocol. With respect to the U-plane, a CS bearer is set along a transmission line between the UE (3G-CS) 20 and the MGW 52. Communication between the MGW 52 and the PSTN/VoIP network 60 is performed according to an RTP (Real-time Transport Protocol)/IP. Herein, an IP address in the case of performing a voice call through the 3G-CS is terminated at the MGCF 54/MGW 52 and hereinafter this IP address will be given as an IPA (3G-CS).

A description will be given in the case of performing a voice call through the LTE. With respect to the C-plane, the UE (LTE) 20 performs communication with the P-GW 42 according to the SIP protocol on a Default bearer (U-plane path for sending/receiving a SIP message) set in access switching of the UE (LTE) 20 to the LTE. Communication between the P-GW 42 and the CSCF 56 and communication between the CSCF 56 and the PSTN/VoIP network 60 are each performed according to the SIP protocol. With respect to the U-plane, communication is performed between the UE (LTE) 20 and the PSTN/VoIP network 60 according to the RTP/IP. Herein, an IP address in the case of performing a voice call through the LTE is terminated at the UE (LTE) 20 and hereinafter this IP address will be given as an IPA (LTE).

Figure 4:
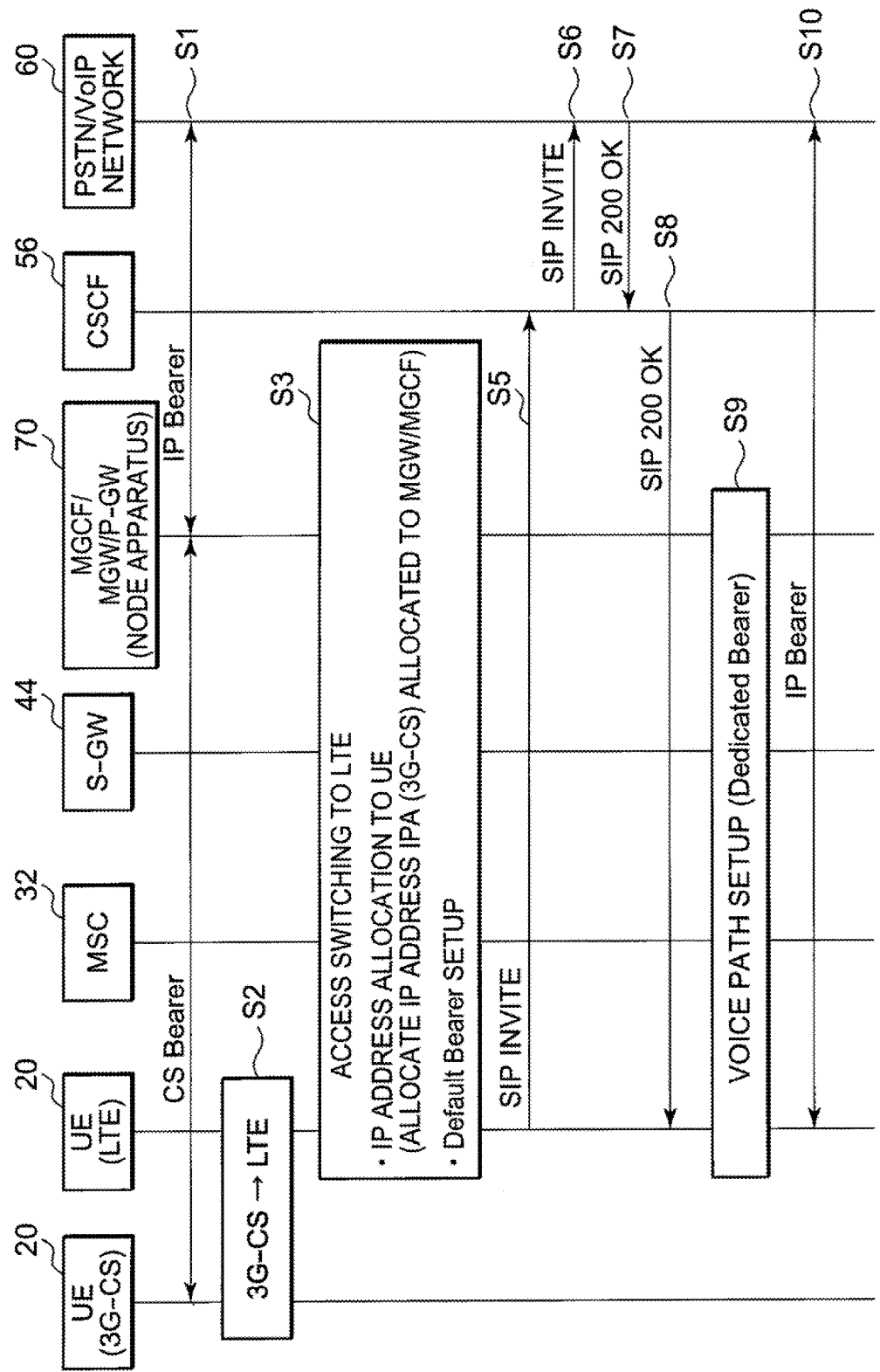
FIG. 4 is a sequence diagram for explaining the operation at the time of handover from the 3G-CS to the LTE in the mobile communication system shown in FIG. 2.

FIG. 4 shows the sequence for explaining the operation of the mobile communication system 10 at the time of handover from the 3G-CS to the LTE.

When the UE (3G-CS) 20 performs a voice call with a communication partner (partner-side UE connected through the PSTN/VoIP network 60), user information is communicated on a CS bearer between the UE (3G-CS) 20 and the MGW 52 and is communicated on an IP bearer between the MGW 52 and the PSTN/VoIP network 60 (step S1).

The UE 20 performs handover from the 3G-CS to the LTE due to, for example, degradation of the radio conditions (step S2). Hereinbelow, the UE 20 having performed handover from the 3G-CS to the LTE will be called the UE (LTE) 20. The UE (LTE) 20 performs access switching to the LTE with respect to the P-GW 42 (step S3).

In this access switching, firstly, the P-GW 42 allocates an IP address to the UE (LTE) 20. How to allocate the IP address will be described in detail hereinbelow.

As described before, the node apparatus 70 integrates the MGW 52/MGCF 54 and the P-GW 42 into one physical node. By integrating the MGW 52/MGCF 54 and the P-GW 42 into one physical node, IP address information that both nodes have separately managed before can be shared between them. Therefore, the P-GW 42 can acquire an IP address IPA (3G-CS) used by the MGW 52 and the MGCF 54 in U-plane and C-plane communications, respectively. The P-GW 42 allocates this acquired IP address IPA (3G-CS) as an IP address IPA (LTE) to be used by the UE (LTE) 20 on the LTE side.

In the access switching, secondly, the P-GW 42 sets a Default bearer, serving as a U-plane path for sending/receiving a SIP message, between the UE (LTE) 20 and the P-GW 42. The UE (LTE) 20 uses the IP address IPA (LTE) allocated from the P-GW 42 and sends a SIP INVITE (request to establish a session) message to the CSCF 56 (step S5). The CSCF 56 sends this SIP INVITE message to the PSTN/VoIP network 60 where the communication partner is present (step S6).

After negotiations between the UE (LTE) 20 and the communication partner for a voice codec according to the SIP protocol, QoS, and so on, the CSCF 56 receives a SIP 200 OK message from the PSTN/VoIP network 60 (step S7). By sending of the SIP 200 OK message from the CSCF 56 to the UE (LTE) 20 (step S8), a voice path (Dedicated Bearer) is set between the UE (LTE) 20 and the P-GW 42 (step S9). By this, an IP bearer is established between the UE (LTE) 20 and the PSTN/VoIP network 60 so that the handover sequence is completed (step S10). That is, a voice service continues between the 3G-CS and the LTE.

Figure 5:
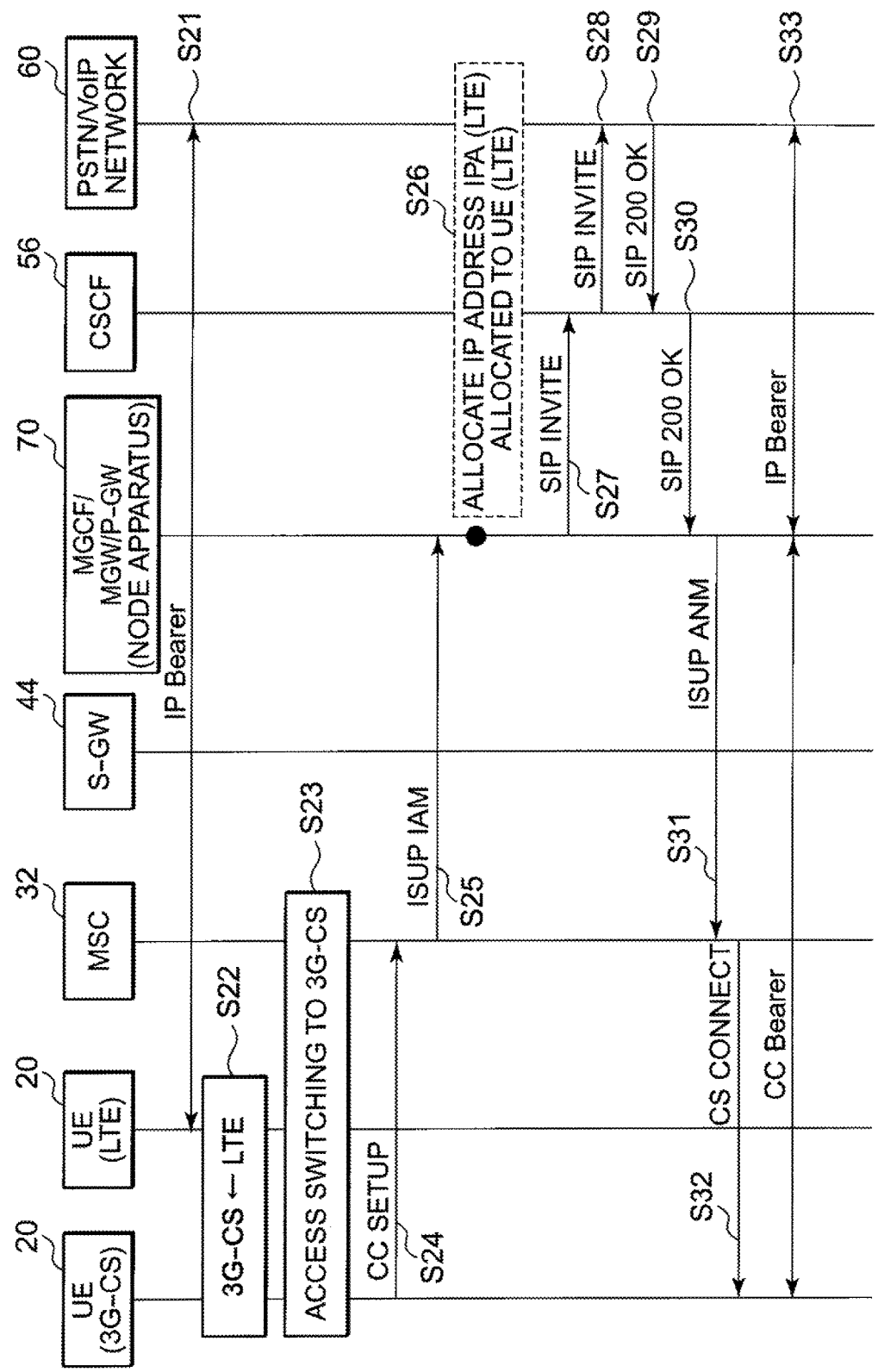
FIG. 5 is a sequence diagram for explaining the operation at the time of handover from the LTE to the 3G-CS in the mobile communication system shown in FIG. 2.

FIG. 5 shows the sequence for explaining the operation of the mobile communication system 10 at the time of handover from the LTE to the 3G-CS.

When the UE (LTE) 20 performs a voice call with a communication partner (partner-side UE connected through the PSTN/VoIP network 60), user information is communicated on an IP bearer between the UE (LTE) 20 and the PSTN/VoIP network 60 (step S21).

The UE 20 performs handover from the LTE to the 3G-CS due to, for example, degradation of the radio conditions (step S22). Hereinbelow, the UE 20 having performed handover from the LTE to the 3G-CS will be called the UE (3G-CS) 20. The UE (3G-CS) 20 performs access switching to the 3G-CS with respect to the MSC 32 (step S23). Since this access switching itself is known, an explanation thereof is omitted.

Then, the UE (3G-CS) 20 sends a CC SETUP (call setup) message to the MSC 32 for setting a voice path (step S24). The MSC 32 sends an ISUP IAM (Initial Address Message) to the MGCF 54 (step S25). The ISUP IAM includes information such as dial numeral information.

As described before, the node apparatus 70 integrates the MGW 52/MGCF 54 and the P-GW 42 into one physical node. By integrating the MGW 52/MGCF 54 and the P-GW 42 into one physical node, IP address information that both nodes have separately managed before can be shared between them. Therefore, the MGCF 54 can acquire an IP address IPA (LTE) used by the UE (LTE) 20 when it is present in the LTE. The MGCF 54 allocates this IP address IPA (LTE) as an IP address IPA (3G-CS) to be used by the MGW 52 and the MGCF 54 in U-plane and C-plane communications, respectively, in the IMS 50 (step S26). The MGCF 54 uses this allocated IP address IPA (3G-CS) and sends a SIP INVITE (request to establish a session) message to the CSCF 56 (step S27).

The CSCF 56 sends this SIP INVITE message to the PSTN/VoIP network 60 where the communication partner is present (step S28). After negotiations between the UE (3G-CS) 20 and the communication partner for a voice codec, QoS, and so on, the CSCF 56 receives a SIP 200 OK message from the PSTN/VoIP network 60 (step S29). The CSCF 56 sends this SIP 200 OK message to the MGCF 54 (step S30). The MGCF 54 performs protocol conversion between the SIP and the ISUP and sends an ISUP ANM (Answer Message) to the MSC 32 (step S31). By sending of a CC CONNECT message from the MSC 32 to the UE (3G-CS) 20 (step S32), a voice path (CS bearer) is set between the UE (3G-CS) 20 and the MGW 52. That is, the CS bearer is established between the UE (3G-CS) 20 and the MGW 52 and an IP bearer is established between the MGW 52 and the PSTN/VoIP network 60 so that the handover sequence is completed (step S33). Therefore, a voice service continues between the 3G-CS and the LTE.

In the mobile communication system 10 according to the embodiment of this invention described above, the node apparatus 70 integrates the MGW 52/MGCF 54 as the first gateway node and the P-GW 42 as the second gateway node, which have never cooperated with each other before, into one physical node. By integrating the MGW 52/MGCF 54 and the P-GW 42 into one physical node, IP addresses that both nodes have separately managed before can be shared between them.

Specifically, the MGCF 54 can acquire an IP address IPA (LTE) used by the UE (LTE) 20 when it is present in the LTE, which is the IP address managed by the P-GW 42. On the other hand, the P-GW 42 can acquire an IP address IPA (3G-CS) used by the MGW 52 and the MGCF 54 in U-plane and C-plane communications, respectively, which is the IP address managed by the MGCF 54.

Accordingly, at the time of handover from the 3G-CS to the LTE, the P-GW 42 can allocate the IP address IPA (3G-CS) to the UE 20. On the other hand, at the time of handover from the LTE to the 3G-CS, the MGCF 54 can allocate the IP address IPA (LTE) to the MGW 52/MGCF 54.

That is, the node apparatus 70 realizes the function equivalent to that required at the VCC-AS at the time of handover. Therefore, with the node apparatus 70, it is possible to make the VCC-AS unnecessary. Accordingly, it is possible to omit communication processing between the CSCF 56 and the VCC-AS that is otherwise required with the use of the VCC-AS (e.g. transfer processing of a call setup message from the CSCF 56 to the VCC-AS, transfer processing of a session update message or a re-session establishing request message from the VCC-AS to the CSCF 56, and so on), and processing of the VCC-AS itself. Therefore, the call traffic in the IMS 50 is reduced and, as a result, the handover processing time can be shortened. Further, since the VCC-AS itself becomes unnecessary, it is possible to reduce the apparatus scale and cost of the IMS 50.

In the above description, the LTE access is cited as one example of the wireless broadband network, but the wireless broadband network is not limited only to the LTE access and, for example, can include a Non-3GPP access. In that case, the Non-3GPP access may be, for example, a WLAN (Wireless LAN), a WiMAX (Worldwide interoperability for Microwave Access), or the like. Further, the CS network is not limited to the 3G-CS network and can be a 2G (2nd Generation)-CS network.

While this invention has been described in terms of the embodiment, this invention is not limited thereto. The structure and details of this invention can be applied with various changes that can be understood by a person skilled in the art within the sprit and scope of this invention described in the claims.

The invention claimed is:

1. A mobile communication system, comprising:
   a first wireless network for supporting circuit switch network;
   a second wireless network for supporting packet switch network;
   an internet protocol multimedia subsystem network for supporting multimedia internet protocol service; and
   an apparatus;
   wherein the apparatus integrates a media gateway, a media gateway control function, and a packet data network gateway into one node,
      wherein the apparatus acquires one internet protocol address used by the first user equipment for communication in the first wireless network and the second wireless network, and the apparatus allocates the one internet protocol address for use by the media gateway and the media gateway control function for user plane and control plane communications, and
   wherein the apparatus switches a call connection path between the first user equipment and a second user equipment via the second wireless network and the first user equipment and the second user equipment via the first wireless network.

2. The mobile communication system of claim 1, wherein the first wireless network includes a 3rd generation circuit switch network.

3. The mobile communication system of claim 1, wherein the second wireless network includes an evolved packet core network through which the first user equipment and the second user equipment access long term evolution service.

4. An access transfer method of a user equipment in a mobile communication system including a first wireless network for supporting circuit switch network, a second wireless network for supporting packet switch network, and an internet protocol multimedia subsystem network for supporting multimedia internet protocol service, the access transfer method comprising:
- accessing the first wireless network or the second wireless network;
- generating a call connection path to another user equipment via the first wireless network or the second wireless network; and
- switching the call connection path between the first wireless network and the second wireless network using an apparatus, the apparatus integrates a media gateway, a media gateway control function, and a packet data network gateway into one node, wherein
  - the apparatus acquires one internet protocol address used by the user equipment for communication in the first wireless network and the second wireless network, and the apparatus allocates the one internet protocol address for use by the media gateway and the media gateway control function for user plane and control plane communications.

* * * * *